(12) United States Patent
Belschner et al.

(10) Patent No.: US 6,656,619 B2
(45) Date of Patent: Dec. 2, 2003

(54) FUEL CELL SYSTEM AND METHOD FOR OPERATING A FUEL CELL

(75) Inventors: Werner Belschner, Notzingen (DE); Joachim Blum, Deizisau (DE); Lars Kaufmann, Kirchheim (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 123 days.

(21) Appl. No.: 09/820,334

(22) Filed: Mar. 29, 2001

(65) Prior Publication Data

US 2001/0041275 A1 Nov. 15, 2001

(30) Foreign Application Priority Data

Mar. 29, 2000 (DE) .......................................... 100 15 654

(51) Int. Cl.[7] .................................................. H01M 8/04
(52) U.S. Cl. ............................ 429/25; 429/13; 429/22; 429/23
(58) Field of Search ............................... 429/13, 22, 23, 429/25; 180/65.3

(56) References Cited

U.S. PATENT DOCUMENTS

| 4,098,959 | A | * | 7/1978 | Fanciullo | ...................... 429/25 |
| 6,266,576 | B1 | * | 7/2001 | Okada et al. | ............... 700/245 |
| 2001/0026777 | A1 | * | 10/2001 | Negishi et al. | ............. 422/112 |

* cited by examiner

*Primary Examiner*—Carol Chaney
(74) *Attorney, Agent, or Firm*—Crowell & Moring LLP

(57) ABSTRACT

In a fuel cell system having a gas generation system for providing hydrogen from a carbon- and hydrogen-containing medium for a fuel cell unit, means are provided for adjusting pressure in the gas generation system and/or mass flow through the fuel cell unit, upstream of the fuel cell unit. In a transition from a part-load range to a full-load range, the pressure can be at least briefly reduced, and in a transition from a full-load range to a part-load range, the pressure can be at least briefly increased.

12 Claims, 2 Drawing Sheets

FUEL CELL SYSTEM AND METHOD FOR OPERATING A FUEL CELL

BACKGROUND AND SUMMARY OF THE INVENTION

This application claims the priority of German patent document 100 15 654.1, filed Mar. 29, 2000, the disclosure of which is expressly incorporated by reference herein.

The invention relates to a fuel cell system having a gas generation system for providing hydrogen from a carbon and hydrogen containing medium, and to a method for operating such a fuel cell system.

In fuel cell powered vehicles, which are operated by hydrogen-containing fluids, such as for example methanol, the response time of the gas generation system is essential to the dynamics of the vehicle. In response to a changed power demand from the driver, for example, more or less hydrogen is generated from methanol in the gas generation system and is provided to the fuel cell. To provide a sufficiently short reaction time of the system, it has been proposed, for example, to use reactors which are as compact as possible and have short gas flow paths in the gas generation system. Such a gas generation system is disclosed, for example, in German patent document DE 197 46 251 C2.

One object of the present invention therefore is to provide a fuel cell system and a method of operating a fuel cell system, which achieve improved dynamic response to changing power demands.

This and other objects and advantages are achieved by the gas generation system and method according to the invention, which includes provision for adjusting pressure in the gas generation system and/or a mass flow through the fuel cell unit, as a function of a load on the fuel cell unit, upstream of a fuel cell unit. In the event of a transition from a part-load range to a full-load range, the pressure can be at least briefly reduced and in the event of a transition from a full-load range to a part-load range, the pressure can be at least briefly increased.

It is beneficial to provide means for pressure regulation, in order to adjust the pressure in the part-load range and/or full-load range.

It is particularly beneficial to provide means for mass-flow regulation, in order to regulate a mass or volumetric flow of a medium supplied to the fuel cell unit.

Other objects, advantages and novel features of the present invention will become apparent from the following detailed description of the invention when considered in conjunction with the accompanying drawings.

DETAILED DESCRIPTION OF THE DRAWINGS

The invention is suitable for fuel cell systems in which a quick dynamic response is required. A particularly preferred application is considered to be mobile systems, particularly for vehicles with fuel cells, which are operated using methanol or another carbon- and hydrogen-containing medium. For the sake of simplicity, in the following text methanol alone is considered as a fuel.

Figure 1:
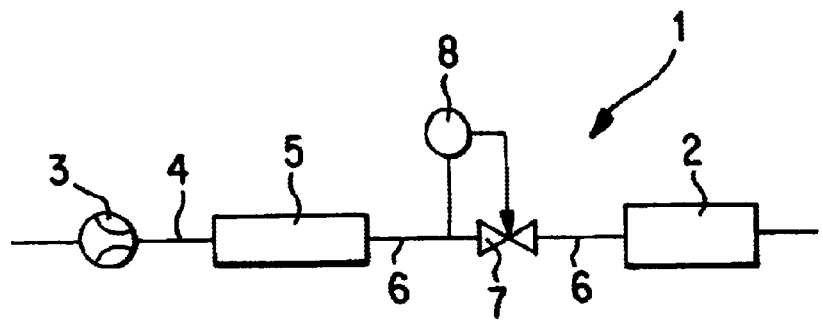
FIG. 1 is a conceptual diagram of a fuel cell system according to the invention, with pressure regulation.

FIG. 1 depicts diagrammatically a fuel cell system 1 for a methanol-operated fuel cell powered vehicle. The fuel cell unit 2, which provides the power for driving the vehicle, comprises one or more fuel cells which are suitably interconnected. A fuel, for example a carbon- and hydrogen-containing medium, such as methanol, is passed into a gas generation system 5 by a metering device 3, via a feed line 4. In the gas generation system 5, hydrogen is obtained by reforming of the medium, which hydrogen is supplied to the fuel cell unit 2 as operating medium via the line 6. A regulating valve 7, which in a first preferred embodiment is a pressure-regulating valve, is provided in the line 6 upstream of the fuel cell unit 2. A pressure sensor 8 monitors the pressure in the gas generation system 5 upstream of the fuel cell unit 2 and adjusts this pressure according to load requirements or load ranges.

Figure 2A:
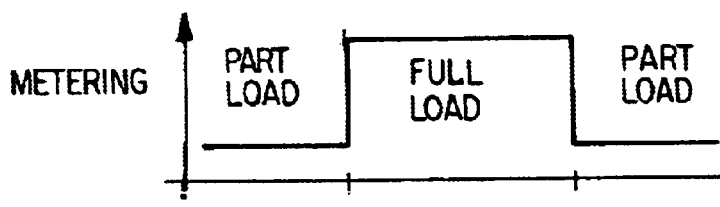
FIGS. 2a–2c are graphs which present a comparison of the temporal curve of fuel metering, desired pressure and mass flow in a fuel cell system according to the invention with pressure regulation.
Figure 2B:
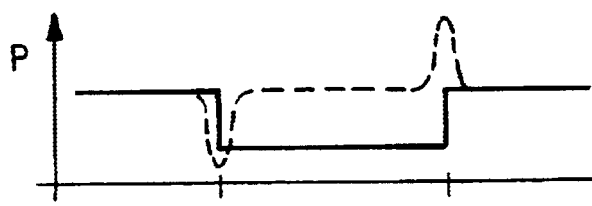
Figure 2C:
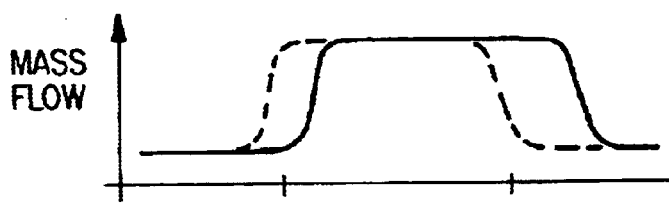

FIGS. 2a–2c show a comparison of the temporal curves of methanol metering, desired pressure in the gas generation system 5 and mass flow of the hydrogen through the fuel cell unit 2 in a fuel cell system according to the invention with pressure regulation. In the part-load range, a correspondingly small quantity of methanol is provided from the metering device 3, as shown in FIG. 2a. In the event of a load change to full load, the quantity of methanol has to be increased, and in the event of a lower load demand, this quantity has to be reduced again. According to the invention, the pressure upstream of the fuel cell unit 2 is adjusted by activation of the regulating valve 7, in such a way that during the transition from the part-load range to the full-load range the pressure is at least briefly reduced and during the transition from the full-load range to the part-load range the pressure is at least briefly increased.

FIG. 2b shows a preferred pressure profile in the gas generation system 5 with pressure regulation (solid line). The pressure of the medium in the gas generation system 5 is higher in the part-load range than in the full-load range. The dashed line shows, as an alternative in accordance with the invention, a pressure curve in which the pressure is only changed briefly in the transition range of a load change. After the transition from part load to full load, the pressure is increased again, preferably to its starting value prior to the load change. Alternatively, after the transition from full load to part load, during which the pressure was briefly increased to above its starting value, the pressure is reduced again.

As a result of the pressure setting of the pressure regulator 7, which also at least indirectly acts on the metering device 3 of the fuel metering for the fuel cell unit 2, the mass flow of the hydrogen through the fuel cell unit 2 very quickly follows the current load requirements. This can be seen in FIG. 2c. The continuous line corresponds to the curve of the mass flow if, for example, the pressure in the gas generation system 5 were simply kept constant. The dashed line represents the curve of the mass flow if, according to the invention, the pressure in the part-load range is higher than in the full-load range or, in the event of a positive load change, the pressure is increased at least briefly or, in the event of a negative load change, the pressure is reduced at least briefly.

The pressure in the gas generation system 5 serves as a control variable for the pressure regulation. The metering of the methanol in the metering device 3 is adjusted according to load requirements. The metering remains substantially identical, even if the pressure varies with load or remains constant. The mass flow through the fuel cell unit 2 follows the pressure setting. In the event of a part load, for a brief transition period more hydrogen than corresponds to the instantaneous consumption of the fuel cell unit 2 is generated, and the pressure in the gas generation system rises to a predetermined level. In the event of a load requirement, it is only necessary for the pressure-regulating valve 7 to be opened, in order to rapidly supply a sufficient quantity of hydrogen to the fuel cell unit 2, so that the speed of the pressure-regulating valve represents the defining factor for the dynamics of the system. However, a pressure-regulating valve can react in a much shorter time than the response time of the gas generation system 5, which may lie in the seconds range.

Figure 3:
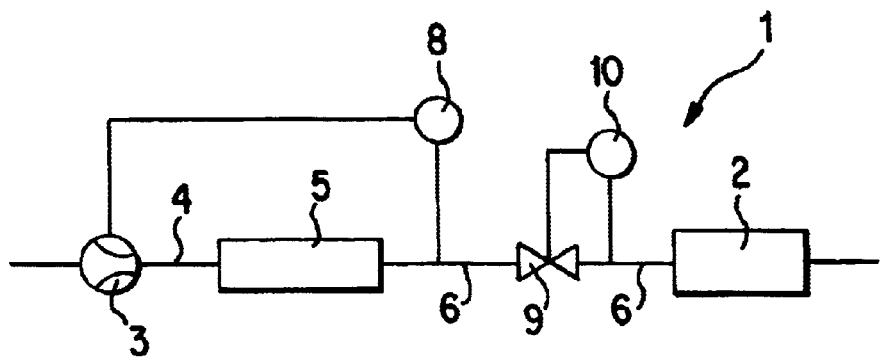
FIG. 3 is a conceptual diagram of another embodiment of a fuel cell system according to the invention, with mass flow regulation.

FIG. 3 diagrammatically depicts a further preferred embodiment of the invention. Identical elements to those shown in FIG. 1 are provided with identical reference symbols. A fuel cell unit 2 of a fuel cell system 1, which provides the power for driving a vehicle, comprises one or more suitably interconnected fuel cells. A carbon- and hydrogen-containing medium is passed into a gas generation system 5 by a metering device 3 via a feed line 4. In the gas generation system 5, hydrogen is extracted from the medium and is supplied to the fuel cell unit 2 as operating medium via the line 6. A regulating valve 9, which in a preferred embodiment is a mass-flow-regulating valve, is provided upstream of the fuel cell unit 2, in order to adjust the hydrogen mass flow through the fuel cell unit 2. A pressure sensor 8 monitors the pressure in the gas generation system 5 upstream of the fuel cell unit 2 and adjusts the metering at the metering device 3 according to load requirements or load ranges. A mass flow sensor 10 monitors the hydrogen mass flow through the fuel cell and acts on the regulating valve 9 according to a current load requirement.

Figure 4A:
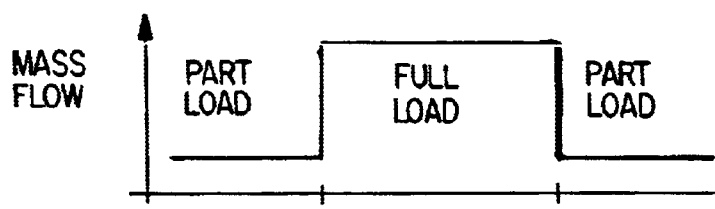
FIGS. 4a–4c are graphs which present a comparison of the temporal curve of fuel metering, desired pressure and mass flow in a fuel cell system according to the invention.
Figure 4B:
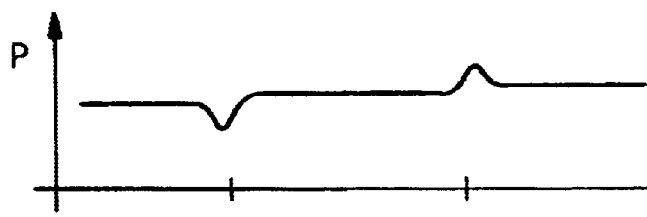
Figure 4C:
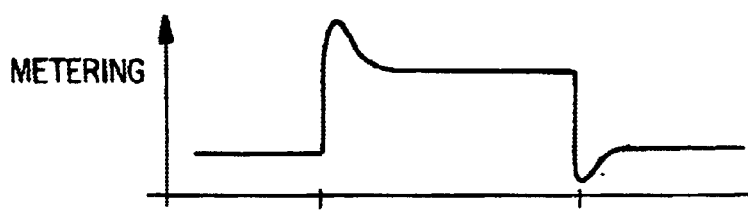

FIGS. 4a–4c show a comparison of the temporal curve of methanol metering, the desired pressure in the gas generation system 5 and mass flow through the fuel cell unit 2 in a fuel cell system 1 according to the invention with mass flow regulation.

Under part load, the hydrogen mass flow through the fuel cell unit 2 is set to a low level (upper curve). In the event of a load change (a transition from part load to full load), the desired value of the mass flow is raised rapidly in accordance with the electrical current demand which is present. In the event of a load change from full load to part load, the mass flow through the fuel cell unit 2 is reduced again.

The pressure in the gas generation system 5 follows the predetermined change in the mass flow since, during transition from the part-load range to the full-load range, the regulating valve 9 allows a greater mass flow to pass through and therefore the pressure falls briefly. During transition from full-load range to part-load range, the pressure rises briefly, since the regulating valve 9 allows less mass flow to pass through (middle curve). After the brief fall, the pressure rises, or after the brief increase, the pressure falls, back to a level which corresponds to the starting value of the pressure. Outside the load change regions, the pressure in the gas generation system is substantially constant. However, it is also possible for different pressure levels to be set in different load ranges.

The pressure sensor 8 records the pressure or the pressure change in the gas generation system 5 and adjusts the metering of methanol to the metering device 3 accordingly. This is illustrated in the curve in FIG. 4c. If, in the event of a positive load change, the pressure falls briefly, the metering is increased and is excessive for a brief period during the transition. Accordingly, in the event of a negative load change with a brief pressure increase, the metering is reduced again, and is briefly reduced to below the desired level. The metering is the control variable in this control loop.

In the arrangement according to the invention, it is possible to dispense with complex and heavy external power buffers. In the event of acceleration of the vehicle, an additional flow of hydrogen for the fuel cell unit 2 is very quickly available. In the event of a load reduction, undesirable "overrun" of the hydrogen is avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fuel cell system comprising:
    a gas generation system for providing hydrogen from a carbon- and hydrogen-containing medium for a fuel cell unit; and
    pressure regulating means for adjusting at least one of pressure in the gas generation system and mass flow through the fuel cell unit as a function of a load on the fuel cell unit, which pressure regulating means are disposed upstream of the fuel cell unit;
    wherein said pressure is adjusted in such a manner that,
    during a transition from a part-load range to a full-load range, the pressure is momentarily reduced; and
    during a transition from a full-load range to a part-load range, the pressure can be momentarily increased.

2. The fuel cell system according to claim 1, wherein the pressure regulating means comprises a pressure-regulating valve upstream of the fuel cell unit.

3. The fuel cell system according to claim 1, wherein the pressure regulating means comprises a mass-flow-regulating valve upstream of the fuel cell unit and a pressure sensor for influencing the metering of fuel at a metering device.

4. A method for operating a fuel cell system comprising a gas generation system for providing hydrogen from a carbon- and hydrogen-containing medium for a fuel cell units and pressure regulating means for adjusting at least one of pressure in the gas generation system and mass flow through the fuel cell unit as a function of a load on the fuel cell unit, which pressure regulating means are disposed upstream of the fuel cell unit, said method comprising:
    during a transition from a part-load range to a full-load range, reducing pressure in the gas generation system momentarily; and
    during a transition from a full-load range to a part-load range, increasing said pressure momentarily.

5. The method according to claim 4, wherein fuel for the fuel cell unit is metered in a manner which varies as a function of a load on the fuel cell unit.

6. The method according to claim 4, wherein fuel for the fuel cell unit is metered at a hither level in a full-load range than in a part-load range.

7. The method according to claim 4, wherein pressure in the gas generation system is set to be higher in a part-load range than in a full-load range.

8. The method according to claim 4, wherein pressure in the gas generation system is kept substantially constant except during load-changes.

9. The method according to claim 1, wherein pressure in the gas generation system is regulated by means of a pressure regulation valve.

10. The method according to claim 4, wherein a mass flow of a fuel supply to the fuel cell unit is regulated.

11. Fuel cell system comprising:

a gas generation system for providing hydrogen from a carbon- and hydrogen-containing medium for a fuel cell unit; and pressure regulating means for adjusting at least one of pressure in the gas generation system and mass flow through the fuel cell unit as a function of a load on the fuel cell unit, which pressure regulating means are disposed upstream of the fuel cell unit;

wherein said pressure is adjusted in such a manner that, the pressure is reduced during the occurrence of a transition from operation of the fuel cell at a maximum load to operation at a partial load, and increased to its previous value upon completion of operation at a partial load;

the pressure is increased during the occurrence of a transition from operation of the fuel cell at a maximum load to operation at a partial load, and increased to its previous value upon completion of operation at a partial load.

12. A method for operating a fuel cell system comprising a gas generation system for providing hydrogen from a carbon- and hydrogen-containing medium for a fuel cell unit, and pressure regulating means for adjusting at least one of pressure in the gas generation system and mass flow through the fuel cell unit as a function of a load on the fuel cell unit, which pressure regulating means are disposed upstream of the fuel cell unit, said method comprising:

reducing the pressure during the occurrence of a transition from operation of the fuel cell at a maximum load to operation at a partial load, and decreasing to its previous value upon completion of operation at a partial load;

increasing the pressure during the occurrence of a transition from operation of the fuel cell at a maximum load to operation at a partial load, and decreasing to its previous value upon completion of operation at a partial load.

* * * * *